March 3, 1970 J. GODET 3,498,022
DEVICES FOR FILLING STORAGE CONTAINERS WITH ROD-SHAPED
PRODUCTS AND ESPECIALLY CIGARS
Filed June 5, 1967

INVENTOR
Jean Godet
By Sparrow and Sparrow
ATTORNEYS

United States Patent Office

3,498,022
Patented Mar. 3, 1970

3,498,022
DEVICES FOR FILLING STORAGE CONTAINERS WITH ROD-SHAPED PRODUCTS AND ESPECIALLY CIGARS
Jean Godet, Paris, France, assignor to Service d'Exploitation Industrielle des Tabacs et des Allumettes, Paris, France, a French public establishment
Filed June 5, 1967, Ser. No. 643,627
Claims priority, application France, June 7, 1966, 64,392
Int. Cl. B65b *19/26, 19/28, 35/32*
U.S. Cl. 53—149                                           2 Claims

ABSTRACT OF THE DISCLOSURE

A device for automatically filling with rod-shaped products, such as cigars, a plurality of containers passing successively beneath feeding means comprising an intermediate storage receptacle having an outlet cross-sectional area which is equal at a maximum value to the inlet cross-sectional area of the containers, means for retaining the products above said containers and means for effecting the relative separation of said retained products and said containers.

---

Figure 1:
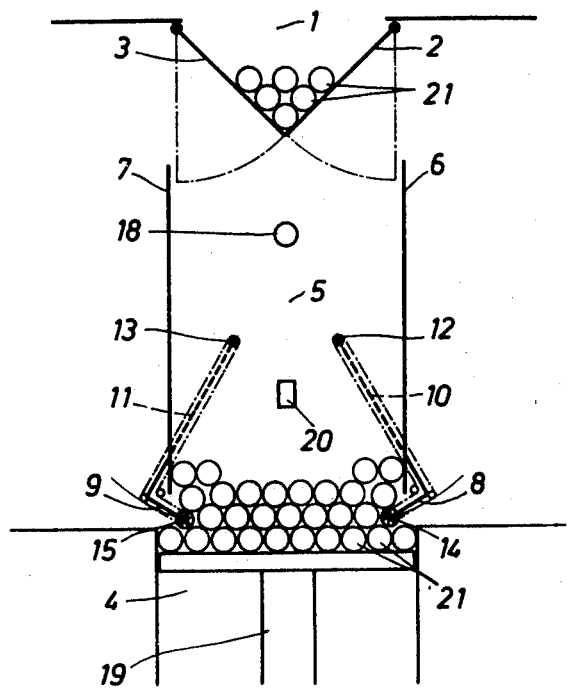

This invention relates to a device whereby trays boxes or like containers which move successively beneath a feeding means are filled with rod-shaped products and especially cigars so that the products which are brought in correct alignment remain in orderly array on completion of the packing operation. The products can be collected on a guide plate and carried thereon towards the bottom of the container.

A device of this type has been described in the U.S. application Ser. No. 615,251, filed on Feb. 10, 1967, now Patent No. 3,445,986, issued May 27, 1969, which is a continuation-in-part of application Ser. No. 461,845, filed on June 7, 1965 and now abandoned.

In devices of this type, there is a potential danger that the products delivered by the feed hopper or like feeding means may not be correctly stacked in the containers to be filled or that, for some reason, they may fall from too great a height, thus entailing the additional danger of "bridge" formation or jamming. Moreover, it is certain that the transfer of stock from one container to another requires a given time interval and that even a very short time interval presents a difficulty in meeting the requirements of a continuous and uniform feed.

The present invention relates to improvements which are intended to circumvent the above-noted disadvantages.

Accordingly, it is a primary object of the invention to provide a filling device which comprises between the feeding means and the containers an intermediate storage receptacle having an outlet cross-sectional area which is at the most equal to the inlet cross-sectional area of the containers, means for retaining the products above said containers and means for producing the relative separation of said retained products and said containers.

The retaining means can consist of two plates for closing the outlet of the intermediate storage receptacle, said plates being movable, for instance pivotally mounted, to swing towards each other or alternatively of two pressure members which are adapted to move towards each other axially of the products.

The pivotal plates can be fitted along their oppositely facing edges with rollers having respective parallel axes and designed to thrust the products towards the top of the intermediate storage receptacle, thus serving as relative separations means. In this case, it is useful to ensure that said rollers are driven in rotation in opposite directions so that they displace the products in an upward direction.

In order to permit the execution of the relative separation movement referred-to, provision can be made for means which lift the intermediate storage receptacle.

Furthermore, it may provide an advantage to mount a temporary retractable support member between the intermediate storage receptacle and the containers.

In order to facilitate the stacking of products without formation of bridges or overlaps, provision can be made for means whereby the walls of the intermediate storage receptacle can be subjected to vibrations of small amplitude in a direction at right angles to said walls.

Finally, when the containers are provided with a movable retaining plate, it is useful to provide at the upper and lower portions of the intermediate storage receptacle means for actuating said plate and consisting, for example of a photoelectric cell disposed at the top of the storage receptacle for the purpose of initiating the downward movement of the retaining plate after said photoelectric cell has been darkened for a sufficient period of time, and microswitch placed at the bottom of the storage receptacle for the purpose of stopping the movement of said plate in the event of an insufficient quantity of products within the intermediate storage receptacle.

Figure 2:
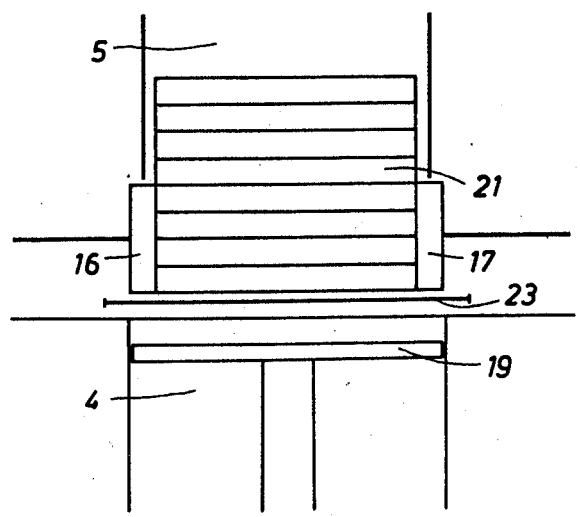

A clear understanding of the operation and advantages of the device according to the invention will be gained from the exemplified embodiment which will now be described below without any implied limitation, reference being made to the accompanying drawings, in which:

FIG. 1 is a diagrammatic sectional view of the device comprising means for distributing products for filling of containers, and FIG. 2 is a partial view of an alternative form comprising retaining pressure pads.

In the example of FIG. 1, the trough 1 is fitted with hinged shutters 2 and 3 and constitutes a hopper for the supply of products which are grouped together. Between this feed-hopper and the container 4 to be filled is placed an intermediate storage receptacle 5 which permits the progressive downward motion of products without any free drop by virtue of the measured accumulation of said products.

Said storage receptacle comprises an admission opening or inlet which is adapted to communicate with the feed-hopper 1 and a discharge opening or outlet having a cross-sectional area which is equal to a maximum value of the cross-sectional area of the contatiner 4 and is located at a short distance from the inlet of said container 4.

The two side walls 6 and 7 which are parallel to the axes of the products can be provided with vibrations of small amplitude (the means for vibrating the walls not shown in the drawing), thus bringing said products into orderly array in contact with each other without permitting the formation of bridges or overlaps.

Two plates 8 and 9 which are adapted to move towards each other are actuated by the arms 10 and 11 connected to pivot-pins 12 and 13 which are secured to one of the faces of the intermediate storage receptacle 5. Said plates are intended to close off the outlet while the container 4 is being replaced. The leading edges of said plates 8 and 9 are fitted with rotating rollers 14 and 15 having shapes which are suited to the product being packed (bi-concave, cylindrical, barrel-shaped and the like), the axes of said rollers being parallel to the axes of the products 21. Said rollers are driven in rotation in such a manner as to rotate in opposite directions (drive means not shown in the drawing) and to push upwards the products which are located on their path.

In the alternative form of FIG. 2, the plates 8 and 9 are replaced by two pressure pads 16 and 17 placed on each side of the intermediate storage receptacle 5 for acting axially of the products 21 in such a manner as to clamp and maintain said products at the bottom of the receptacle while making it possible to displace this latter upwardly, thus moving it away from a full container 4 during the time which is necessary to interpose a support plate 23 by mechanical means, not shown, in the drawing.

A photoelectric cell 18 which is placed at the upper portion of the intermediate storage receptacle 5 is intended to initiate the downward motion of the retaining plate 19 after being darkened for a sufficient period of time. A micro-switch 20 which is placed in the lower portion of the storage receptacle 5 is adapted to cause stopping of the downward motion of the plate 19 when this latter is released as a result of an insufficient quantity of products.

When the products 21 which are retained in the feed-hopper 1 are released as a result of the opening movement of the shutters 2 and 3, said products accordingly move down into position above the retaining plate 19 inside the container 4 and are then stacked one above the other inside the intermediate storage receptacle 5. The vibrations to which the walls 6 and 7 are subjected cause the products to collect in orderly array and in close contact with each other.

As soon as the height of stacked products reaches the level of the photoelectric cell 18 and this latter is darkened for a predetermined period of time, the plate 19 begins to move down and is followed in this movement by the products 21 which progressively fill the container 4. When the container is full, the arms 10 and 11 perform a pivotal movement about the pins 12 and 13 and push the moving plates 8 and 9 towards each other beneath the discharge opening of the intermediate storage receptacle 5. The rollers 14 and 15 which rotate in opposite directions produce an upward thrust on the products 21 which are located on their paths, thus providing a free passageway for the plates 8 and 9 which completely close off the outlet of the intermediate storage receptacle 5 and retain the products 21 which are contained therein. The complete storage receptacle is then lifted so as to free the full container to a sufficient extent and to permit the replacement of this latter by an empty container as well as the upward displacement of the retaining plate 19 to its top position inside the fresh container.

The intermediate storage receptacle 5 then moves down so as to come into position very close to the container inlet, the plates 8 and 9 then separate and the products are deposited on the plate 19 which begins to move down inside the storage receptacle if the photoelectric cell 18 is darkened.

When the level of products drops to a point below the level of the micro-switch 20, the plate 19 is stopped in its downward motion and only resumes this movement when the photoelectric cell 18 is darkened.

In the alternative embodiment which is shown in FIG. 2, when the container 4 is completely filled, the two pressure pads 16 and 17 which are fabricated of a flexible material such as foam rubber are thrust towards each other and are thus caused to compress the products 21 along their axes. The action of the pressure pads prevents any downward movement of the products while the complete intermediate storage receptacle 5 is being lifted. Thus, a sufficient clearance is allowed for the withdrawal of the full container which can then be replaced by an empty container after the plate 23 has moved into position for the purpose of holding the products in position. When the retaining plate 19 has been moved to its top position in the fresh container, the intermediate storage receptacle 5 drops to the immediate vicinity of the container inlet, the pressure pads 16 and 17 move outwards and the products are then deposited on the plate 19 which begins to move downwards.

In another embodiment which can be employed in combination with either one or the other of the preceding embodiments, at least one of the pads 16 and 17 can be provided with a device such as a jack with a reciprocating movement in a direction at right angles to its plane for exerting a pressure at the ends of the cigars or like products and for positioning them in correctly packed alignment. This alternating motion could be carried out in synchronism with the motion of the product-feeding device, and its cycle could be such that the movement of withdrawal of the pad prevents any danger of interference with the downward motion of cigars or like products.

What I claim is:

1. A device for automatically filling with rod-shaped products, such as cigars, a plurality of containers passing successively beneath feeding means, said device comprising an intermediate storage receptacle having an outlet cross-sectional area which is equal at a maximum value to the inlet cross-sectional area of said containers, means for retaining said products above said containers, means for effecting the relative separation of said retained products for effecting the relative separation of said retained products and said containers, said retaining means comprising two plates adapted to move towards each other for closing said outlet of said intermediate storage receptacle; said plates having oppositely facing edges and comprising rollers along said edges, said rollers having parallel axes for displacing said products upwardly within said intermediate storage receptacle, said rollers constituting said relative separation means.

2. A device according to claim 1, and means on said rollers for positively driving said rollers in opposite directions of rotation.

References Cited

UNITED STATES PATENTS

| 2,873,063 | 2/1959 | Schweiter | 53—242 X |
| 3,435,586 | 4/1969 | Scherr | 53—242 |
| 3,447,283 | 6/1969 | Godet | 53—148 |
| 1,601,257 | 9/1926 | Molins | 53—149 |
| 2,770,392 | 11/1956 | Roberts | 53—150 X |
| 2,919,529 | 1/1960 | Hillman | 53—148 |
| 2,933,872 | 4/1960 | Pollman | 53—258 |
| 3,005,299 | 10/1961 | Dietiker | 53—248 |
| 3,027,699 | 4/1962 | Miller | 53—236 |
| 3,119,217 | 1/1964 | Brownlee | 53—236 |

WAYNE A. MORSE, JR., Primary Examiner

U.S. Cl. X.R.

53—150, 236, 242, 248